United States Patent
Murdock et al.

(10) Patent No.: US 6,222,883 B1
(45) Date of Patent: Apr. 24, 2001

(54) VIDEO ENCODING MOTION ESTIMATION EMPLOYING PARTITIONED AND REASSEMBLED SEARCH WINDOW

(75) Inventors: John A. Murdock, Apalachin; Agnes Y. Ngai, Endwell; Edward F. Westermann, Endicott, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,383

(22) Filed: Jan. 28, 1999

(51) Int. Cl.[7] ................................................... H04N 7/12
(52) U.S. Cl. ............................ 375/240.16; 348/416.1; 348/699
(58) Field of Search ..................... 375/240.16, 240.17; 348/416.1, 413.1, 699, 700; 382/236, 238; 386/111

(56) References Cited

U.S. PATENT DOCUMENTS

| | | | |
|---|---|---|---|
| 5,331,436 | 7/1994 | Ida et al. | 358/426 |
| 5,673,339 | * 9/1997 | Lee | 382/236 |
| 5,699,122 | 12/1997 | Jung | 348/420 |
| 5,719,629 | 2/1998 | Chun | 348/413 |
| 5,734,737 | * 3/1998 | Chang et al. | 348/416.1 |
| 5,838,823 | 11/1998 | Ancessi | 382/232 |
| 5,959,673 | * 9/1999 | Lee et al. | 348/416.1 |

OTHER PUBLICATIONS

Nikkei Electronics Asia, Special Report, "MPEG–2 Enconder Makers Eye Camcorders, Optical Disks", *Reducing Motion Vector Search Calculations*, vol. 7, No. 5, May 1998, 2 p.

* cited by examiner

*Primary Examiner*—Vu Le
(74) *Attorney, Agent, or Firm*—Heslin & Rothenberg, P.C.

(57) ABSTRACT

A digital video encoder is provided having an enhanced search range for motion estimation and compensation. The encoder is adapted to define from a reference frame a diamond-shaped search window about a current position of a current macroblock to be encoded. The encoder partitions the diamond-shaped search window into multiple search regions and reassembles the multiple search regions into a rectangular search area. This rectangular search area is then used to search the diamond-shaped search window for a best matching reference macroblock to the current macroblock.

24 Claims, 8 Drawing Sheets fig. 1 fig. 2 fig. 3 fig. 4 fig. 5A fig. 5B fig. 6A fig. 6B fig. 7A fig. 7B fig. 8A fig. 8B fig. 8C

VIDEO ENCODING MOTION ESTIMATION EMPLOYING PARTITIONED AND REASSEMBLED SEARCH WINDOW

TECHNICAL FIELD

This invention relates in general to an apparatus and method for encoding digital visual images including spatial (intra-picture) and temporal (inter-picture) compression, that is reducing both redundancy within a picture and redundancy between pictures. Redundancy within pictures is reduced, or even eliminated, by the use of the discrete cosine transform, quantization, and variable length encoding. Redundancy between pictures is reduced, or even eliminated, through the use of motion vectors. This invention is more particularly directed to an encoder with an enhanced search range for motion estimation and compensation, without adversely impacting chip performance or design criteria.

BACKGROUND OF THE INVENTION

The Moving Picture Experts Group (MPEG) MPEG-2 Standard is a compression/decompression standard for video applications. The standard describes an encoded and compressed data stream that has substantial bandwidth reduction. The compression is a subjective lossly compression. The encoded, compressed digital video data is subsequently decompressed and decoded in an MPEG-2 Standard compliant decoder.

The MPEG-2 Standard is described in, e.g., C. A. Gonzales and E. Viscito, "Motion Video Adaptive Quantization In The Transform Domain," IEEE Trans Circuits Syst Video Technol, Volume 1, No. 4, December 1991, pp. 374–378, E. Viscito and C. A. Gonzales, "Encoding of Motion Video Sequences for the MPEG Environment Using Arithmetic Coding," SPIE, Vol. 1360, pp. 1572–1576, (1990), D. LeGall, "MPEG: A Video Compression Standard for Multimedia Applications," Communications of the ACM, Vol. 34, No. 4, (April 1991), pp. 46–58, S. Purcell and D. Galbi, "C Cube MPEG Video Processor," SPIE, v. 1659, (1992) pp. 24–29, and D. J. LeGall, "MPEG Video Compression Algorithm," Signal Process Image Commun, v.4, n. 2, (1992), pp. 129–140, among others.

The MPEG-2 Standard specifies a data stream format and a decoder for a very high compression technique that achieves overall image data stream compression not achievable with either intraframe coding alone or interframe coding alone, while preserving the random access advantages of pure intraframe coding. The combination of block based frequency domain intraframe encoding and interpolative/predictive interframe encoding of the MPEG-2 Standard results in a balance between intraframe encoding alone and interframe encoding alone.

The MPEG-2 Standard exploits temporal redundancy for motion compensated interpolative and predictive encoding. That is, the assumption is made that "locally" the current picture can be modeled as a translation of the picture at a previous and/or future time. "Locally" means that the amplitude and direction of the displacement are not the same everywhere in the picture.

The MPEG-2 Standard specifies predictive and interpolative interframe encoding and frequency domain intraframe encoding. It has block based motion compensation for the reduction of temporal redundancy, and block based Discrete Cosine Transform based compression for the reduction of spatial redundancy. Under the MPEG-2 Standard, motion compensation is achieved by predictive coding, interpolative coding, and Variable Length Coded motion vectors. The information relative to motion is based on a 16×16 array of pixels and is transmitted with the spatial information. Motion information is compressed with Variable Length Codes, such as Huffman codes.

The motion compensation unit under the MPEG-2 Standard is the Macroblock unit. The MPEG-2 Standard Macroblocks are 16×16 pixels. Motion information consists of vectors for forward predicted macroblocks, vectors for backward predicted macroblocks, and vectors for bidirectionally predicted macroblocks. The motion information associated with each macroblock is coded differentially with respect to the motion information present in the previous macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

In a typical block matching search for video encoding motion estimation, the reference search area is rectangular in shape. The width and height of this rectangle is referred to as the search range, as it represents a portion of the reference frame around the position of the macroblock to be coded in which a best match result is sought to compensate for motion between the current and reference frames. The larger the search range, the better the chance to find a nearly identical macroblock to the one being encoded. With a good match, fewer bits are needed to encode the macroblock since all that is required is the vector showing the displacement from the current macroblock, and the small differences between the macroblocks.

High definition video requires large search ranges due to its higher resolutions. The full size of a high definition television (HDTV) frame makes encoding the entire picture by a single encoder prohibitive. Conventionally, multiple encoders are employed, with each encoder encoding a portion of the picture. The portions are then stitched together to create one encoded stream. Motion searching needs to overlap at the seams (i.e., the borders of each encoder's portion of the whole picture), to minimize visual artifacts.

Increasing the search range by simply increasing the maximum size of the rectangle is one possible solution, but may have an adverse effect on encoder performance. Generally, the larger the search range, the more time it takes to perform the search. Increasing the maximum rectangle also entails adding more data storage capability on chip, which will increase encoder size and power consumption.

In view of the above, and in order to establish commercial advantage, a novel approach is needed for performing macroblock match searching during video encoding motion estimation, particularly for high definition video.

DISCLOSURE OF THE INVENTION

Briefly summarized, the invention comprises in one aspect a macroblock matching search method for video encoding motion estimation. The method includes: defining from a reference frame a diamond-shaped search window about a current position of the macroblock; partitioning the diamond-shaped search window into multiple search regions and reassembling the multiple search regions into a rectangular search area; and using the rectangular search area to search within the diamond-shaped search window for a best matching reference macroblock to the current macroblock.

In another aspect, a macroblock matching search method for video encoding motion estimation within a video encoding system is provided. This method includes: providing a rectangular search area comprising a partitioned and reassembled diamond-shaped search window containing macroblocks of a reference frame; and searching within the diamond-shaped search window for a best matching reference macroblock for the current macroblock using the rectangular search area, the searching including selecting a starting position and traversing the rectangular search area stepwise horizontally and vertically to identify the best matching reference macroblock.

In still another aspect, a system for performing motion estimation within a digital video encoder is provided. The system includes means for defining from a reference frame a diamond-shaped search window about a current position of a macroblock being encoded. The system also includes means for partitioning the diamond-shaped search window into multiple search regions and for reassembling the multiple search regions into a rectangular search area, as well as means for using the rectangular search area to search the diamond-shaped search window for a best matching reference macroblock for the current macroblock.

In a further aspect, an article of manufacture is provided which includes a computer program product having computer usable medium with computer readable program code means therein for use in performing macroblock match searching during video encoding motion estimation. The computer readable program code means in the computer program product comprises computer readable program code means for causing a computer to effect: defining from a reference frame a diamond-shaped search window about a current position of the macroblock; partitioning the diamond-shaped search window into multiple search regions and reassembling the multiple search regions into a rectangular search area; and using the rectangular search area to search within the diamond-shaped search window for a best matching reference macroblock for the current macroblock.

To restate, an encoding method, system and computer program product are provided herein which employ an enhanced search range for motion estimation and compensation without adversely impacting chip performance or design criteria. More particularly, by reassembling the diamond-shaped search window into a rectangular area, motion estimation time using this rectangular area is identical to employing a commensurate rectangular search window, notwithstanding that the rectangular area now comprises the diamond-shaped search window having an enlarged horizontal and/or vertical search range. Similarly, chip size and power are not effected since no increase in storage capacity is required over that of the rectangular search area. The macroblocks that represent interfacing edges of the diamond-shaped window before it is folded are preferably replicated as described herein to ensure that the search area is complete within the folded diamond. The cutoff corners of the larger rectangular window, from which the diamond-shaped search window is defined, again are not searched. These non-searched corners of the larger rectangular search window are deemed to be of less value in performing motion estimation than the balance of the window, i.e., the diamond-shaped portion of the search window.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

The invention relates to scalable MPEG and HDTV compliant encoders and encoding processes. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are the temporal compression functions. Spatial and temporal compression are repetitive functions with high computational requirements.

More particularly the invention relates to a processor for performing spatial and temporal compression including discrete cosine transformation, quantization, entropy encoding, motion estimation, motion compensation, and prediction, and even more particularly to a system for accomplishing spatial and temporal compression.

The scalable processor system has an I-frame only video encoder module with a Discrete Cosine Transform processor, a quantization unit, a variable length encoder, a FIFO buffer, and a compressed store interface. The system also includes a second processor element, that is, an R-processor or Reconstruction processor with a reference memory interface, motion estimation and compensation capability, inverse quantization, and inverse discrete cosine transformation, and motion compensation means; and at least one third processor element for motion estimation. The system can be in the form of a single integrated circuit chip, or a plurality of integrated circuit chips, that is one for each processor, the I-frame video encoder module, the second processor element, and the third processor element. There can be one or more of the third processor units.

The first compression step is the elimination of spatial redundancy, for example, the elimination of spatial redundancy in a still picture of an "I" frame picture. Spatial redundancy is the redundancy within a picture. Because of the block based nature of the motion compensation process, described below, it was desirable for the MPEG-2 Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After transformation, many of the frequency coefficients are zero, especially the coefficients for high spatial frequencies. These coefficients are organized into a zig-zag pattern, and converted into run-amplitude (runlevel) pairs. Each pair indicates the number of zero coefficients and the amplitude of the non-zero coefficient. This is coded in a Variable Length Code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

Figure 1:
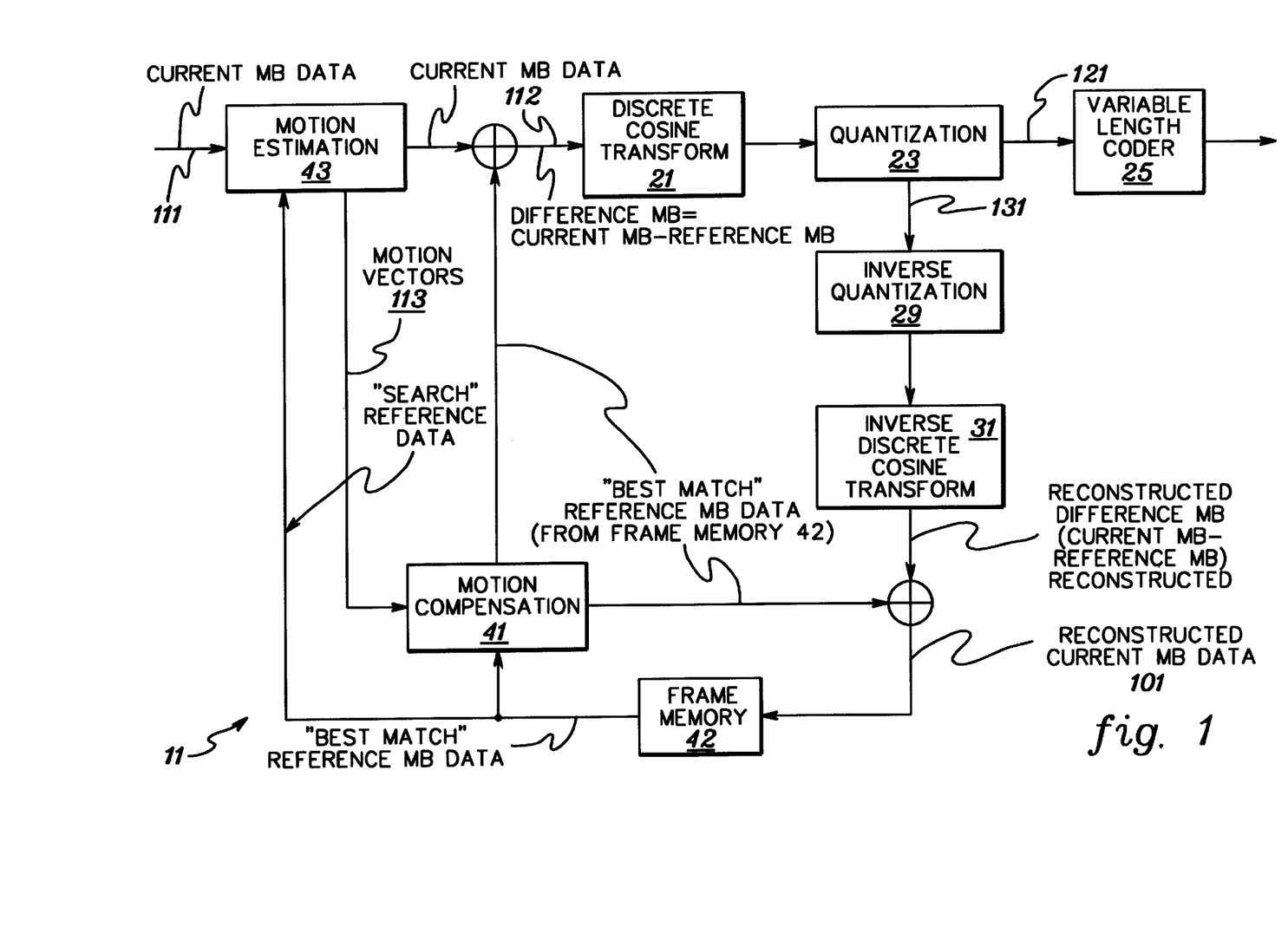
FIG. 1 shows a flow diagram of a generalized MPEG2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113, the picture output 121, the feedback picture for motion estimation and compensation 131, and the reconstructed picture 101. This figure has the assumptions that the $i^{th}$ picture exists in Frame Memory or Frame Store 42, and that the $i+1^{th}$ picture is being encoded with motion estimation.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors instead of full images is a key aspect of temporal compression in the MPEG and HDTV standards. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the Motion Estimation unit 43 of the encoder. Motion vectors 113 are formed as the output of the Motion Estimation unit 43. These vectors are used by the Motion Compensation Unit 41 to retrieve macroblock data from previous and/or future pictures, referred to as "reference" data, for output by this unit. One output of the Motion Compensation Unit 41 is negatively summed with the output from the Motion Estimation unit 43 and goes to the input of the Discrete Cosine Transformer 21. The output of the Discrete Cosine Transformer 21 is quantized in a Quantizer 23. The output of the Quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in Frame Memory 42. In the encoder shown for purposes of illustration, this second output 131 goes through an inverse quantization 29 and an inverse discrete cosine transform 31 to return a lossy version of the difference macroblock. This data is summed with the output of the Motion Compensation unit 41 and returns a lossy version of the original picture to the Frame Memory 42.

Figure 2:
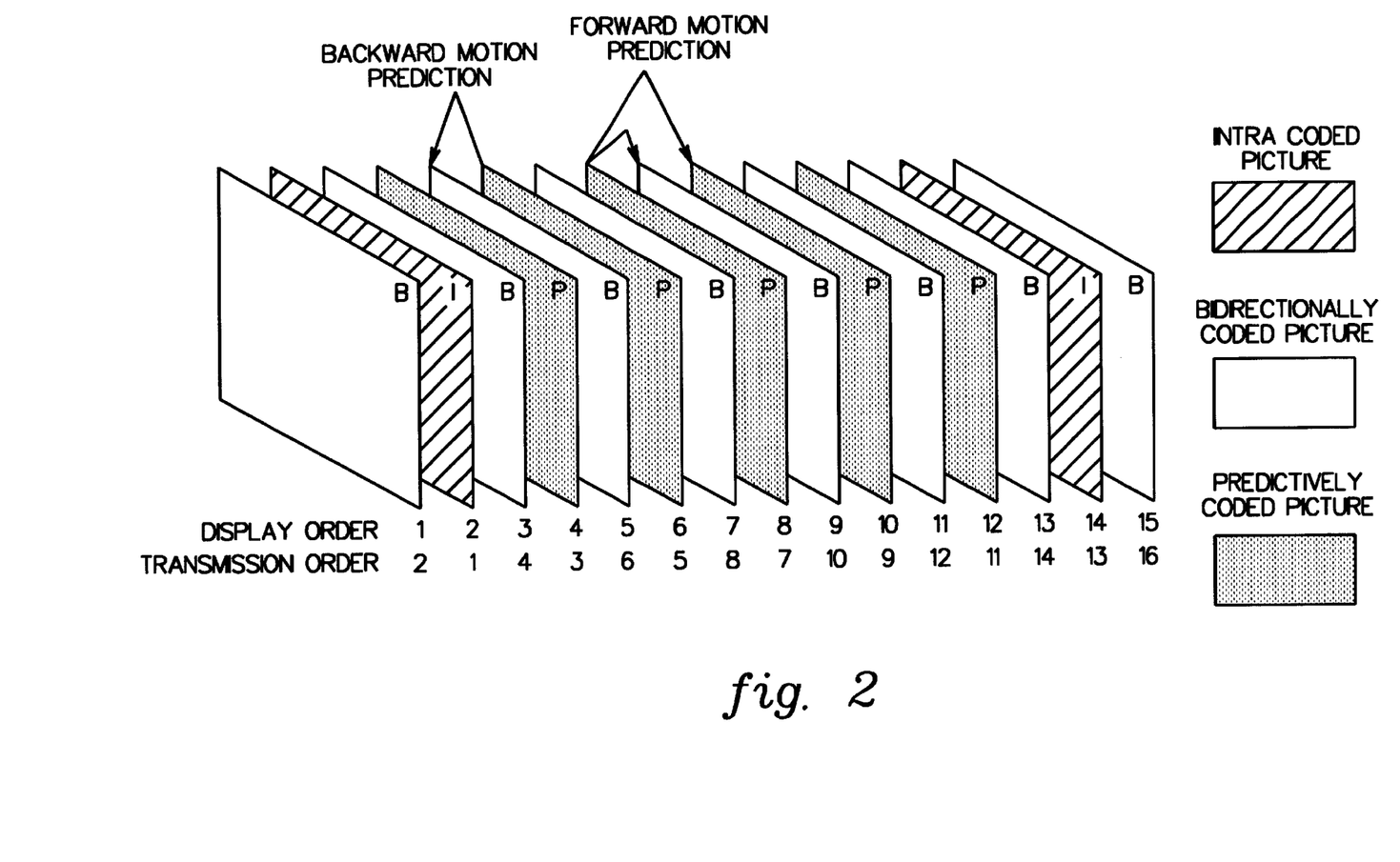
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a source of motion vectors. There are "Predicted pictures" or "P" pictures which are formed by motion vectors from a previous picture and can serve as a source of motion vectors for further pictures. Finally, there are "Bidirectional pictures" or "B" pictures which are formed by motion vectors from two other pictures, one past and one future, and can not serve as a source of motion vectors. Motion vectors are generated from "I" and "P" pictures, and are used to form "P" and "B" pictures. "P" and "B" pictures are also referred to as "Nonintra" or "Inter" pictures.

Figure 3:
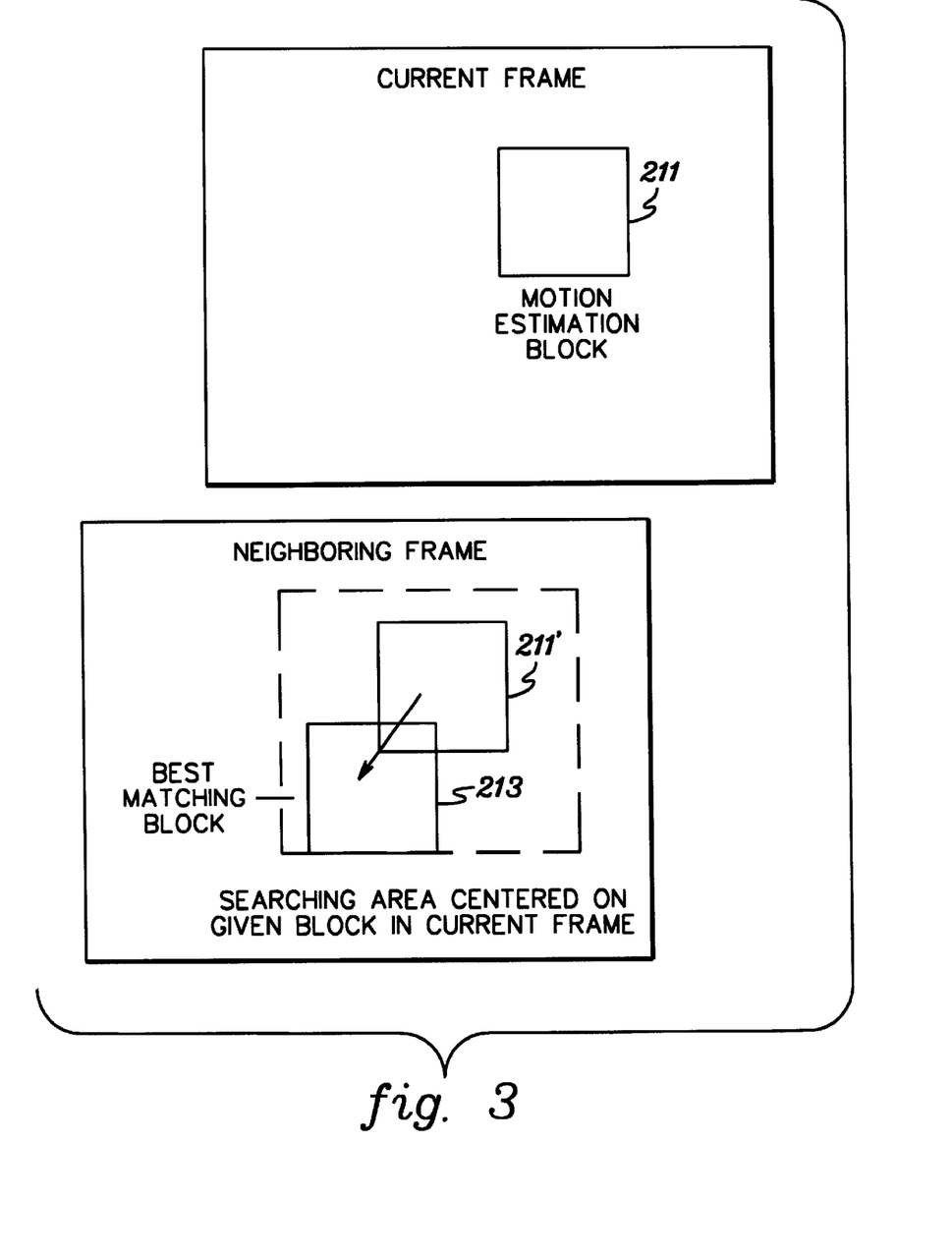
FIG. 3 illustrates the search from the motion estimation block in the current frame or picture to the best matching block in a subsequent or previous frame or picture. Elements 211 and 211' represent the same location in both pictures.
Figure 4:
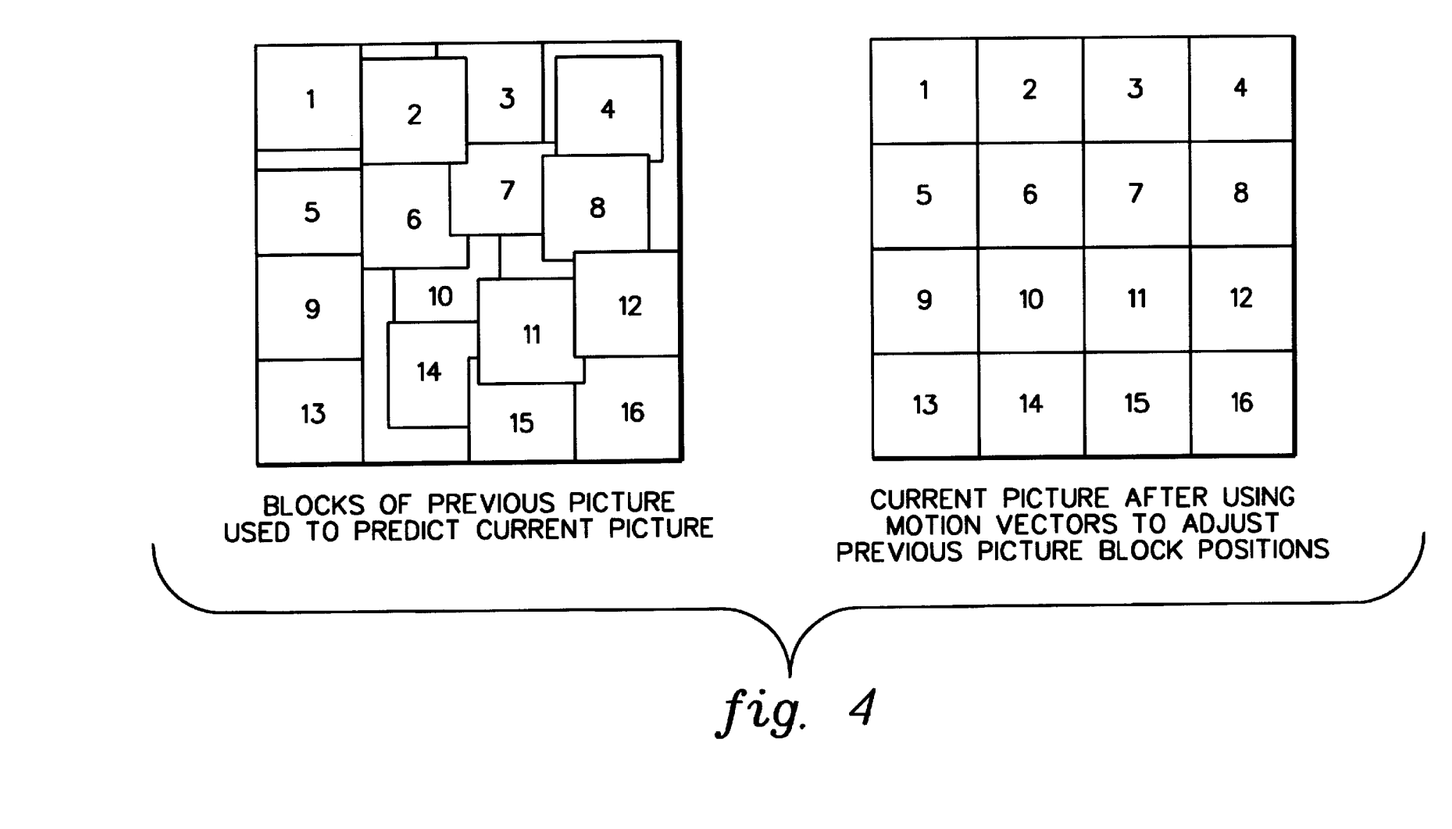
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG2 encoder are implemented in three basic devices: an I or Intra device, an R or Reconstruction or Reference device, and an S or Search device. The functions are partitioned according to application needs, silicon size, tools and design complexity, and performance. The I, R and S devices are described in detail in a co-pending, commonly assigned United States patent application by Murdock et al., entitled "Macroblock Bit Regulation Schemes For Video Encoder," Ser. No. 08/859, 544, the entirety of which is hereby incorporated herein by reference.

Figure 5A:
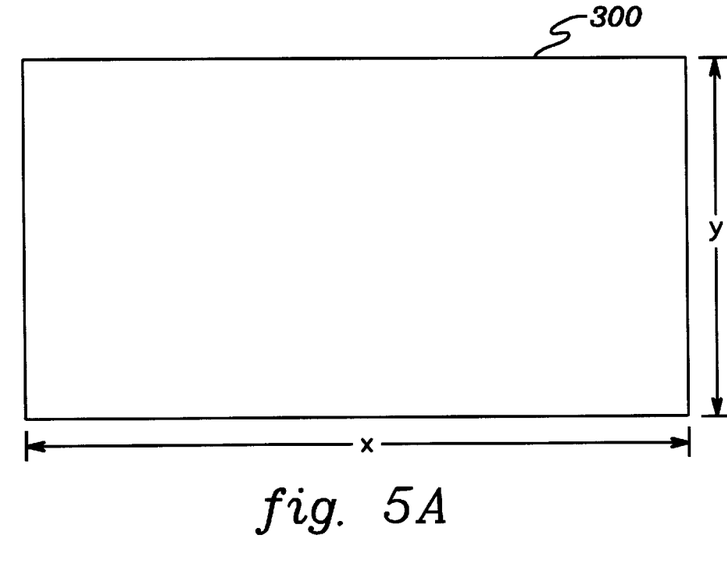
FIG. 5a shows one example of a conventional motion estimation search window.

As noted briefly above, the present invention is directed to providing MPEG encoders with an enhanced search range capability without sacrificing performance or design criteria. FIG. 5a depicts a typical reference search area 300 for video encoding motion estimation. As shown, area 300 has a rectangular shape, and the width 'x' and height 'y' of this rectangle define the search range. The search range represents a portion of the reference picture about a position of a current macroblock to be coded in which a best match result is sought to compensate for motion between the current frame and the reference frame. Again, the larger the search range, the better the chance to find a nearly identical macroblock to the current one being encoded.

Figure 5B:
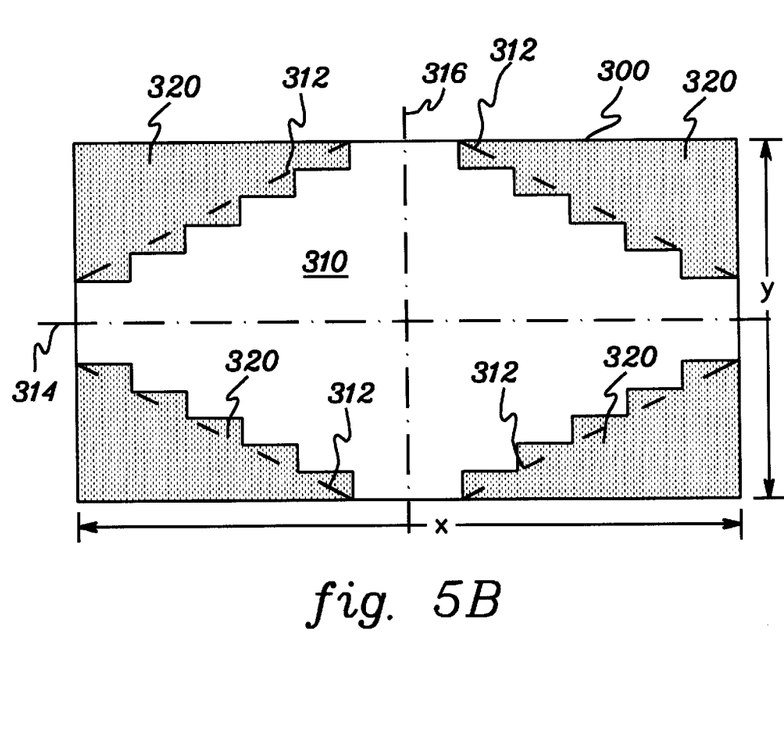
FIG. 5b depicts one embodiment of a diamond-shaped motion estimation search window to be employed for video encoding motion estimation in accordance with the principles of the present invention.

FIG. 5b depicts one embodiment of a "diamond-shaped" motion estimation search window in accordance with the principles of the present invention. The "diamond-shape" is an approximation and is best seen by viewing phantom lines 312. The diamond-shaped search window 310 is preferably created by symmetrically removing areas 320 at the corners of the rectangular search window 300, thereby resulting in a symmetrical search window about horizontal axis 314 and vertical axis 316 as shown. To maintain macroblock borders within the window, the diamond-shape is "saw-toothed" along its angled edges so that no portion of the macroblock crosses over into a non-search area during macroblock matching. The saw-toothed edges of the diamond-shaped search window are shown exaggerated in FIGS. 5b–8c for clarity, i.e., FIGS. 5b–8c are not necessarily drawn to scale.

Those skilled in the art will note that various sized and shaped diamond-shaped search windows can be formed by removing search area from the corners of a conventional rectangular search window. Further, it should be noted that although a symmetric diamond-shaped search window is preferred, a non-symmetric search window may also be employed in accordance with the principles of the present invention. Further, the horizontal and vertical proportions of the diamond-shaped search window can be varied. By way of specific example, if a 16×16 pixel macroblock is assumed to be centered about the horizontal axis 314 and vertical axis 316, then a desired search window may extend vertically 96 pixels above and 96 pixels below the macroblock, and 192 pixels to the left and 192 to the right of the macroblock in the horizontal direction.

Figure 6A:
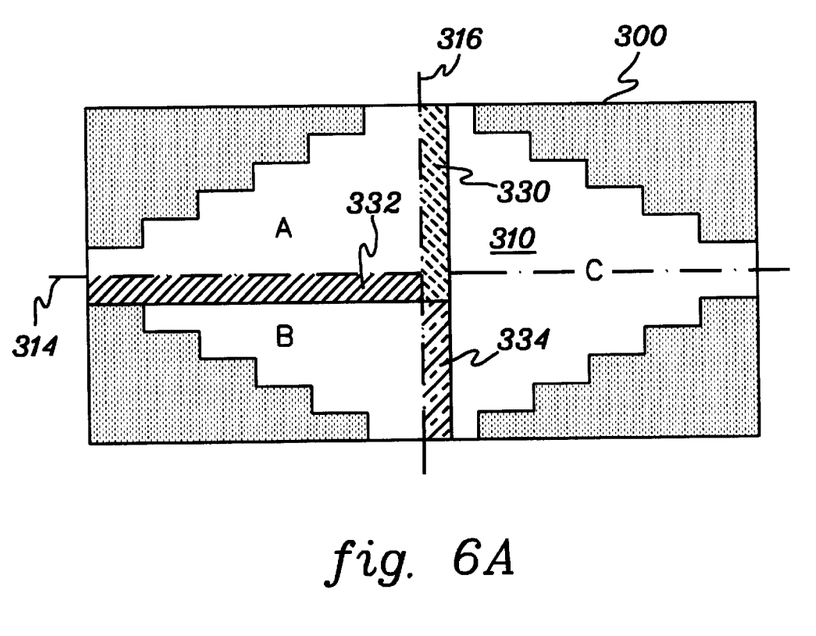
FIG. 6a shows the diamond-shaped motion estimation search window of FIG. 5b partitioned into regions A, B & C with overlapping areas therebetween in accordance with the principles of the present invention.
Figure 6B:
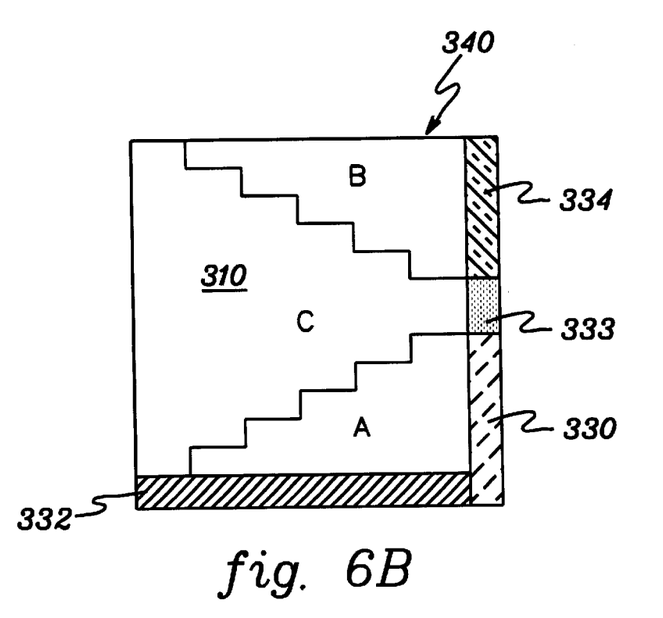
FIG. 6b depicts the partitioned diamond-shaped motion estimation search window of FIG. 6a reassembled into a rectangular search range in accordance with the principles of the present invention.

In accordance with the principles of the present invention, the diamond-shaped search window is partitioned and reassembled (i.e., folded) back into a rectangular search area. One embodiment of partitioning in accordance with this invention is depicted in FIG. 6a. In this embodiment, the diamond-shaped search window 310 is partitioned into regions A, B & C, with region C extending to the right of a vertical line, such as vertical axis 316, and regions A & B extending to the left of the vertical line. Further, region A extends above a horizontal line, such as horizontal axis 314, and region B extends below the horizontal line. Along the interior edges of regions A, B & C of the diamond-shaped search window 310, overlap areas 330, 332 and 334 are defined as shown. In one example, overlap area 330 may comprise 16 pixels to the right of vertical axis 316 (i.e., from region C) added to or repeated as part of region A. Similarly, overlap area 332 may comprise 16 pixels of region B below horizontal axis 314 added to region A, and overlap area 334 may comprise 16 pixels of region C added to region B. These overlap areas are needed in order to ensure that a full macroblock is searchable along the boundaries between regions A, B & C when doing a left to right, top to bottom stepwise search through the diamond-shaped search window reassembled as a rectangular search area such as shown in FIG. 6b. When assembled, a small area 333 of the rectangular search area 340 remains unused.

As noted, the partitioned regions are reassembled in accordance with this invention, e.g., by folding search regions A & B back to the cutaway corners of region C, recreating a substantially rectangular search area. This folded rectangle 340 now contains a much larger portion of interest of the reference frame, although it is of similar size as a conventional, smaller rectangular search range. The non-searched corners 320 (FIG. 5b) of the original rectangular search window are known to be of less value in performing motion estimation than the balance of the window, i.e., the diamond-shaped portion of the search window. Advantageously, by reassembling the diamond-shaped search window into a rectangular area, performance is not impacted since the amount of data searched is identical. Similarly, chip size and power are not effected since no increase in storage capacity is required. The macroblock rows that represent the interfacing edges of the diamond window before it is folded are replicated, as illustrated by the overlap areas of the figure. This introduces a slight redundancy, but ensures that the search area is complete within the folded diamond. The cutoff corners 320 of the large rectangular window (FIG. 5*b*) again are not searched. As noted, this is a small tradeoff since most motion occurs along the x axis and y axis. Motion that occurs in the corners can be compensated with a lesser match, or by intra coding the macroblock.

Figure 7A:
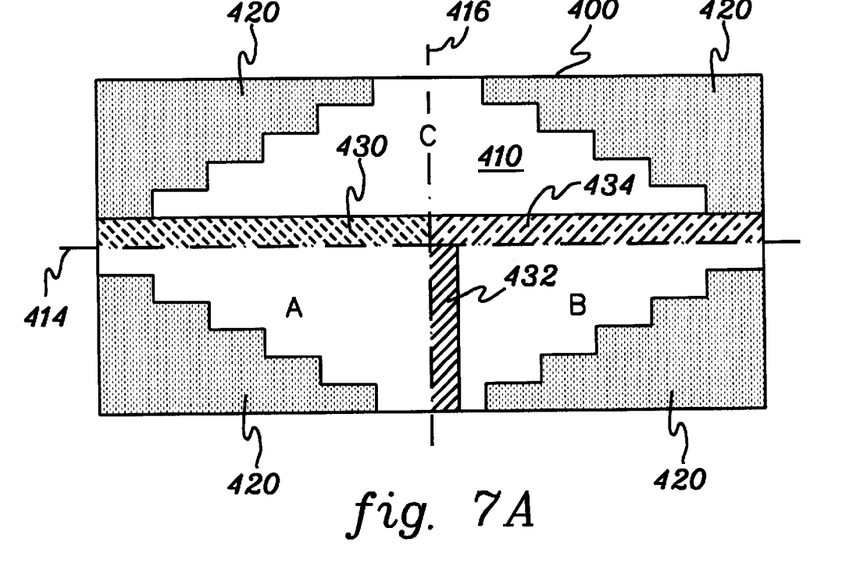
FIG. 7a depicts another embodiment of a diamond-shaped motion estimation search window partitioned into regions A, B & C in accordance with the principles of the present invention.
Figure 7B:
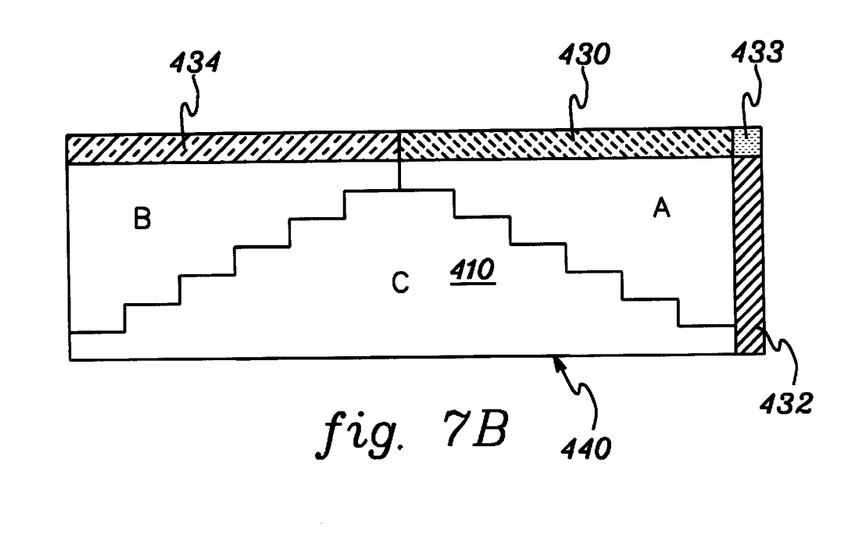
FIG. 7b shows the diamond-shaped motion estimation search window of FIG. 7a reassembled into a rectangular search range in accordance with the principles of the present invention.

FIGS. 7*a* & 7*b* depict an alternate embodiment for partitioning and reassembling a diamond-shaped search window in accordance with the principles of the present invention. In this embodiment, diamond-shaped search window 410 is again formed by symmetrically removing areas 420 from the corners of a conventional search window. The resultant diamond-shaped search window 410, which is symmetrical about a horizontal axis 414 and a vertical axis 416, is partitioned in one example such that region C is defined above horizontal axis 414 and regions A & B are defined below horizontal axis 414. Vertical axis 416 separates region A from region B. As in the embodiment of FIGS. 6*a* & 6*b*, overlap areas are defined at the interface between regions A and C, between regions B and C, and between regions A and B. These overlap areas 430, 432 and 434 ensure that when stepwise searching through the reassembled search area, a full macroblock can be searched along the interior edges of the regions.

FIG. 7*b* depicts the reassembled search area 440 for the diamond-shaped search window 410. A small area 433 of the rectangular search area 440 remains unused.

Figure 8A:
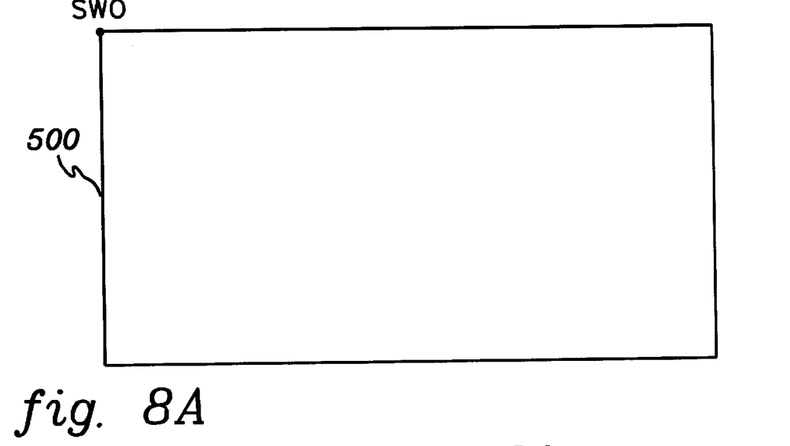
FIG. 8a is again an example of a conventional motion estimation search window showing a search window origin (SWO) point for motion estimation searching at the upper left of the window.

One embodiment of addressing for the rearranged diamond search window is explained below with reference to FIGS. 8*a*–8*c*. A search window origin (SWO) address is defined as the starting fetch address for a typical rectangular search window 500 (FIG. 8*a*). This SWO address is conventionally the upper-left corner of the search window, and the address (as well as the search window) changes with each new current macroblock to undergo motion estimation.

Figure 8B:
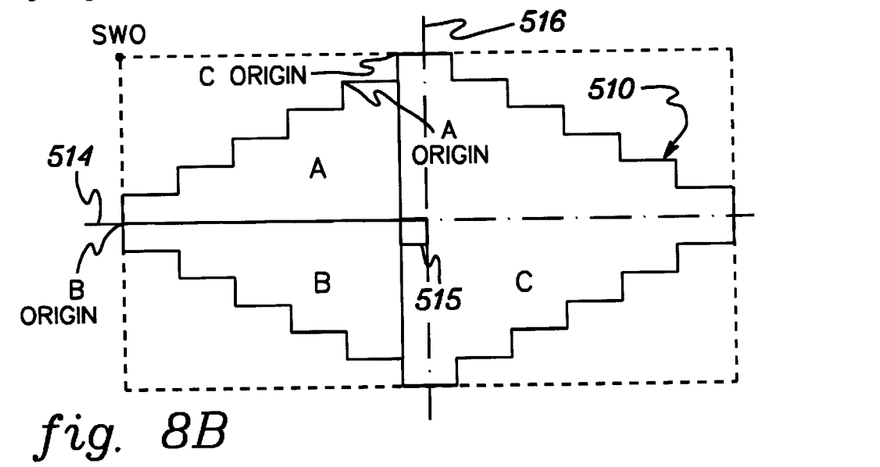
FIG. 8b depicts a diamond-shaped motion estimation search window partitioned in accordance with the principles of the present invention and showing origin points for addressing each of the partitioned regions A, B & C of the search window.
Figure 8C:
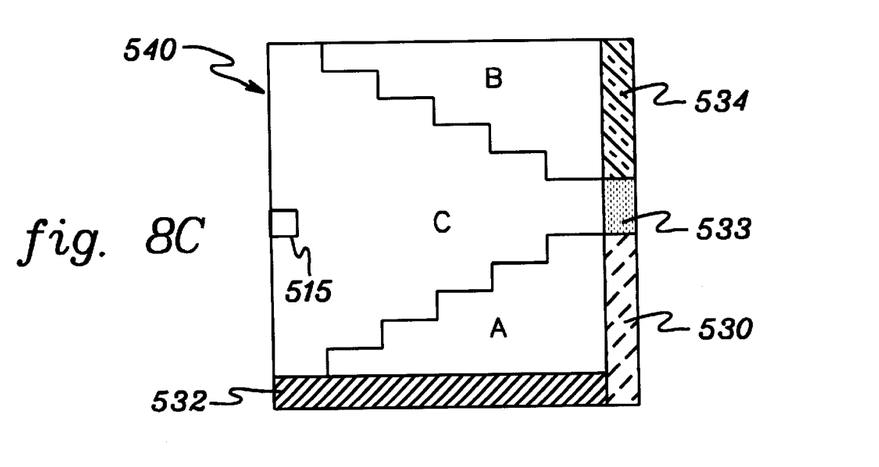
FIG. 8c depicts the diamond-shaped motion estimation search window of FIG. 8b reassembled into a rectangular search range in accordance with the principles of the present invention.

For a diamond search window, the SWO is determined the same way, with the rectangle being the smallest rectangle that completely contains the reassembled diamond (see FIG. 8*b*). Based on the shape and dimensions of the diamond search window to be used, origins are calculated for region A, region B and region C from SWO. The calculations are unique for each unique diamond that may be used. This is due to the arbitrary and non-uniform granularity possible in the steps. The implementer can readily calculate the specific formulas based on the size and shape of the particular diamond search window employed.

In addition, because of the probable irregularities in the steps, the fetching of data to create a folded diamond in accordance with the present invention is preferably designed into the motion estimation hardware. Specifically, the switching from region to region is preferably a set pattern implemented within hardware. For example:

Make 50 fetches from region A starting with region A's origin.

Make 30 fetches from region B starting with region B's origin.

Increment the final address fetched by region A by X amount.

Make 50 fetches from region A starting with this new address.

In cases where the stepsize is uniform, formulas may be readily determined.

Those skilled in the art will note from the above discussion that a folded diamond search in accordance with this invention optimizes the regions of the motion estimation search without adversely impacting chip performance or design criteria, such as chip size and power consumption. By cutting the search window into a diamond-shape, and then folding the diamond-shape into a rectangular search area, an optimal reference range is maintained within a smaller size search area.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A macroblock matching search method for video encoding motion estimation, said method comprising:

defining from a reference frame a diamond-shaped search window about a current position of said macroblock;

partitioning the diamond-shaped search window into multiple search regions and reassembling the multiple search regions into a rectangular search area; and using the rectangular search area to search within the diamond-shaped search window for a best matching reference macroblock for said macroblock.

2. The method of claim 1, wherein said using comprises stepping horizontally and vertically through said rectangular search area to identify said best matching reference macroblock.

3. The method of claim 1, wherein said defining comprises providing a rectangular window in said reference frame about said current position, and omitting corners of said rectangular window to create said diamond-shaped search window.

4. The method of claim 3, wherein said omitting comprises dropping said corners by stepping edges of said diamond-shaped search window so that only complete macroblocks exist within said diamond-shaped search window.

5. The method of claim 3, wherein said omitting corners comprises omitting corners of said rectangular window symmetrically to create said diamond-shaped search window.

6. The method of claim 1, wherein said defining comprises defining a symmetrical diamond-shaped search window about said current position, and said partitioning comprises dividing said diamond-shaped search window along a horizontal line or a vertical line thereof to create two halves of said diamond-shaped search window, and further dividing one half of said diamond-shaped window such that said diamond-shaped window is partitioned into a one half region, a one quarter region and a one quarter region, and wherein said reassembling comprises positioning said quarter regions about said one half region such that said rectangular search area is defined.

7. The method of claim 1, further comprising buffering said rectangular search area in a motion estimation search memory space, said motion estimation search memory space being smaller than a memory space required to hold a rectangular window encompassing said diamond-shaped search window without said partitioning and reassembling thereof.

8. The method of claim 1, wherein said defining comprises defining said diamond-shaped search window to have a horizontal dimension larger than a vertical dimension.

9. The method of claim 1, wherein said using comprises stepping horizontally left to right and vertically top to bottom through said rectangular search area to identify said best matching reference macroblock of said diamond-shaped search window, said using beginning with pixels in an upper left most corner of said rectangular search area.

10. The method of claim 9, wherein said using further comprises determining an upper left most origin point for each search region of said multiple search regions reassembled into said rectangular search area, and employing said upper left most origin points in addressing pixels within said multiple search regions when performing said horizontal and vertical stepping through said rectangular search area.

11. A macroblock matching search method for video encoding motion estimation within a video encoding system, said method comprising:
  providing a rectangular search area comprising a partitioned and reassembled diamond-shaped search window containing macroblocks of a reference frame; and
  searching within the diamond-shaped search window for a best matching reference macroblock for said macroblock using the rectangular search area, said searching comprising selecting a starting position and traversing said rectangular search area stepwise horizontally and vertically to identify said best matching reference macroblock.

12. The method of claim 11, wherein said stepwise horizontal and vertical traversing through said rectangular search area comprises starting said searching within said diamond-shaped search window at the upper left most corner of said rectangular search area and traversing left to right, top to bottom through said rectangular search area.

13. The method of claim 11, wherein said partitioned diamond-shaped search window comprises multiple search regions, and wherein said providing comprises providing overlap areas at interfacing regions of said multiple search regions, said overlapped areas comprising part of said rectangular search area.

14. A system for performing motion estimation within a digital video encoder, said system comprising:
  means for defining from a reference frame a diamond-shaped search window about a current position of a current macroblock;
  means for partitioning the diamond-shaped search window into multiple search regions and for reassembling the multiple search regions into a rectangular search area; and
  means for using the rectangular search area to search within the diamond-shaped search window for a best matching reference macroblock for said current macroblock.

15. The system of claim 14, wherein said means for using comprises means for stepping horizontally and vertically through said rectangular search area to identify said best matching reference macroblock.

16. The system of claim 14, wherein said means for defining comprises means for providing a rectangular window in said reference frame about said current position, and for omitting corners of said rectangular window to create said diamond-shaped search window.

17. The system of claim 16, wherein said means for omitting comprises means for dropping said corners by stepping edges of said diamond-shaped search window so that only complete macroblocks exist within said diamond-shaped search window.

18. The system of claim 14, further comprising a buffer for buffering said rectangular search area, said buffer comprising motion estimation search memory space, said motion estimation search memory space being smaller than a memory space required to hold a rectangular window encompassing said diamond-shaped search window without said partitioning and reassembling thereof.

19. The system of claim 14, wherein said means for defining comprises means for defining said diamond-shaped search window to have a horizontal dimension larger than a vertical dimension.

20. The system of claim 14, wherein said means for using comprises means for stepping horizontally left to right and vertically top to bottom through said rectangular search area to identify said best matching reference macroblock of said diamond-shaped search window beginning with pixels in an upper left most corner of said rectangular search area.

21. An article of manufacture comprising:
  a computer program product comprising computer usable medium having computer readable program code means therein for use in performing macroblock match searching during video encoding motion estimation, said computer readable program code means in said computer program product comprising:
    computer readable program code means for causing a computer to effect defining from a reference frame a diamond-shaped search window about a current position of said macroblock;
    computer readable program code means for causing a computer to effect partitioning the diamond-shaped search window into multiple search regions and reassembling the multiple search regions into a rectangular search area; and
    computer readable program code means for causing a computer to effect using the rectangular search area to search within the diamond-shaped search window for a best matching reference macroblock for said current macroblock.

22. The article of manufacture of claim 21, wherein said computer readable program code means for causing a computer to effect using comprises computer readable program code means for causing a computer to effect stepping horizontally and vertically through said rectangular search area to identify said best matching reference macroblock within said diamond-shaped search window.

23. The article of manufacture of claim 21, wherein said computer readable program code means for causing a computer to effect defining comprises computer readable program code means for causing a computer to effect defining said diamond-shaped search window to have a horizontal dimension larger than a vertical dimension.

24. The article of manufacture of claim 21, wherein said computer readable program code means for causing a computer to effect using comprises computer readable program code means for causing a computer to effect stepping horizontally left to right and vertically top to bottom through said rectangular search area to identify said best matching reference macroblock of said diamond-shaped search window beginning with pixels in an upper left most corner of said rectangular search area.

* * * * *